United States Patent [19]
Seno et al.

[11] Patent Number: 5,991,711
[45] Date of Patent: Nov. 23, 1999

[54] LANGUAGE INFORMATION PROCESSING APPARATUS AND METHOD

[75] Inventors: Kunihiro Seno; Hiromi Furusawa; Nobuki Hagiwara; Kentaro Tsuchiya, all of Ebina, Japan

[73] Assignee: Fuji Xerox Co., Ltd., Tokyo, Japan

[21] Appl. No.: 08/805,266

[22] Filed: Feb. 24, 1997

[30] Foreign Application Priority Data

Feb. 26, 1996 [JP] Japan ................................. 8-038295

[51] Int. Cl.$^6$ .................................................. G06F 17/28
[52] U.S. Cl. ............................... 704/3; 704/8; 704/277; 704/260; 379/88.05
[58] Field of Search .................... 704/2, 3, 4, 5, 704/7, 260, 277, 258, 261, 267, 268, 270, 8; 379/88.05, 88.06

[56] References Cited

U.S. PATENT DOCUMENTS

| | | | |
|---|---|---|---|
| 4,489,433 | 12/1984 | Suehiro et al. | 704/221 |
| 4,503,426 | 3/1985 | Mikulski | 345/171 |
| 4,523,331 | 6/1985 | Asija | 382/192 |
| 4,843,589 | 6/1989 | Yoshida et al. | 704/2 |
| 4,866,670 | 9/1989 | Adachi et al. | 704/5 |
| 4,962,452 | 10/1990 | Nogami et al. | 704/5 |
| 5,020,155 | 5/1991 | Griffin et al. | 359/154 |
| 5,091,950 | 2/1992 | Ahmed | 704/277 |
| 5,321,801 | 6/1994 | Ando | 707/535 |
| 5,357,596 | 10/1994 | Takebayashi et al. | 704/275 |
| 5,384,701 | 1/1995 | Stentiford et al. | 704/3 |
| 5,523,943 | 6/1996 | Maruta et al. | 704/4 |
| 5,539,741 | 7/1996 | Barraclough et al. | 370/267 |
| 5,587,902 | 12/1996 | Kugimiya | 704/2 |
| 5,612,872 | 3/1997 | Fujita | 704/2 |
| 5,640,575 | 6/1997 | Maruyama et al. | 704/4 |
| 5,642,466 | 6/1997 | Narayan | 704/260 |
| 5,724,526 | 3/1998 | Kunita | 704/277 |
| 5,758,320 | 5/1998 | Asano | 704/258 |
| 5,815,196 | 9/1998 | Alshawi | 348/17 |

FOREIGN PATENT DOCUMENTS

A-57-137962  8/1982  Japan.

*Primary Examiner*—Joseph Thomas
*Attorney, Agent, or Firm*—Oliff & Berridge, PLC

[57] ABSTRACT

A language information processing apparatus for translating a model phrase in a first language into a corresponding second language and outputting the translated phrase. The apparatus includes a display that displays the phrase, an input device for inputting a character or a word to be added in the first language to the phrase displayed by the display, a first voice information storage device that stores voice information in the second language corresponding to the phrase, and a second voice information storage device that prepares and stores voice information concerning the character or word in the first language with an intonation in the first language, which character or word is input by the input device. The apparatus further includes a translation instruction device for instructing the translation of the phrase containing the character or the word in the first language, which character or word has been added by the input device, and a voice information reading device that reads the voice information in the second language corresponding to the phrase from the first voice information storage device under instruction from the translation instruction device, and reads the added character or word in the first language from the second voice information storage device.

17 Claims, 12 Drawing Sheets

FIG. 3A

| JAPANESE PHRASE DATA ADDRESS 60 | JAPANESE PHRASE DATA 61 | ENGLISH PHRASE DATA ADDRESS 62 | ENGLISH PHRASE DATA 63 |
|---|---|---|---|
| a | KONNICHIWA | a x 1000 (h) | HELLO. |
| a + 1 | & WATASHIWA *** TO MOUSHIMASU | a x 1000 (h) + 1 | & MY NAME IS ***. |
| a + 2 | SAYOUNARA | a x 1000 (h) + 2 | GOOD BYE |
| ........ | ........ | ........ | ........ |

64 — Japanese phrase bracket; 66 — English phrase bracket

FIG. 3B

| JAPANESE VOICE DATA ADDRESS 70 | JAPANESE VOICE DATA 71 | | ENGLISH VOICE DATA ADDRESS 72 | ENGLISH VOICE DATA 73 | |
|---|---|---|---|---|---|
| a x 2000 (h) | KONNICHIWA | | a x 3000 (h) | HELLO | |
| a x 2000 (h) + 1 | WATASHIWA | TO MOUSHIMASU | a x 3000 (h) + 1 | MY NAME IS | VOICELESS DATA |
| a x 2000 (h) + 2 | SAYOUNARA | | a x 3000 (h) + 2 | GOOD BYE | |
| ........ | ........ | | ........ | ........ | |

76 — Voiceless data bracket

FIG. 4A

NOUN PORTION DATA

| CHARACTER DATA ADDRESS | REGISTRATION CARACTER DATA |
|---|---|
| n | YA |
| n + 1 | YO |
| n + 2 | MU |
| n + 3 | TI |
| n + 4 | YA |
| n + 5 | * |
| n + 6 | * |
| n + 7 | * |
| n + 8 | * |
| n + 9 | * |
| ⋮ | ⋮ |
| n + 20 | * |

FIG. 4B

CHARACTER VOICE DATA

| VOICE DATA ADDRESS | CHARACTER VOICE DATA |
|---|---|
| m | A |
| m + 1 | I |
| m + 2 | U |
| m + 3 | E |
| m + 4 | O |
| m + 5 | KA |
| m + 6 | KI |
| m + 7 | KU |
| m + 8 | KE |
| m + 9 | KO |
| ⋮ | ⋮ |

FIG. 5A

KATAKANA CHARACTERS

| A | I | U | E | O |
|---|---|---|---|---|
| KA | KI | KU | KE | KO |
| SA | SI | SU | SE | SO |
| TA | TI | TU | TE | TO |
| NA | NI | NU | NE | NO |
| HA | HI | HU | HE | HO |
| MA | MI | MU | ME | MO |
| YA | | YU | | YO |
| RA | RI | RU | RE | RO |
| WA | WO | UN | | |
| GA | GI | GU | GE | GO |
| ZA | ZI | ZU | ZE | ZO |
| DA | DI | DU | DE | DO |
| BA | BI | BU | BE | BO |
| PA | PI | PU | PE | PO |
| A | I | U | E | O |
| YA | YU | YO | | |

FIG. 5B

CHARACTER STRINGS IN CASES WHERE TWO CHARACTERS ARE PRONOUNCED WITH ONE SOUND

| KYA | KYU | KYO | |
|---|---|---|---|
| SYE | SYA | SYU | SYO |
| TYE | TYA | TYU | SYO |
| TEI | | | |
| NYA | NYU | NYO | |
| HYA | HYU | HYO | |
| FA | FI | FE | FO |
| MYA | MYU | MYO | |
| RYA | RYU | RYO | |
| GYA | GYU | GYO | |
| JE | JA | JU | JO |
| DYA | DYU | DYO | |
| DEI | | | |
| BYA | BYU | BYO | |
| PYA | PYU | PYO | |

MENU SCREEN

SCREEN IN NOUN REGISTRATION MODE

LANGUAGE INFORMATION PROCESSING APPARATUS AND METHOD

BACKGROUND OF THE INVENTION

The present invention relates to a language information processing apparatus fit for use as a portable translation apparatus or an electronic translation apparatus, for example.

Language information processing apparatus have heretofore been devised to translate into another predetermined language (e.g., into English) a model phrase that a user has chosen from among fixed forms of model phrases (e.g., in Japanese) prepared in advance and to display the translated phrase on a display unit and/or voice the phrase in the target language as in the case of a portable or electronic translation apparatus. In order to make compliant translation possible, further, a certain type of language information processing apparatus is adapted so that the user may register any characters in a predetermined portion (portion with * * * ) of a model phrase like 'My name is * * * ' and 'I live in * * * ,' for example.

However, such a conventional language information processing apparatus has the following problems concerning the displaying and voicing of characters or a word thus registered by the user.

(1) In a case where a registered character string is pronounced in a way peculiar to the source translation language, a problem arising therefrom is that the registered portion may not be properly pronounced in a target translation language when it is attempted to have the registered character string translated and pronounced.

(2) In a case where a registered character string consists of characters peculiar to the source translation language such as kana characters or Hangul alphabets, the registered portion may not be properly displayed in a target translation language when a model phrase is translated and displayed. When 'Tom' is converted into roman letters, for example, it may be displayed as 'Tomu' instead of 'Tom' as a correct display.

Therefore, the result of translation of the registered portion is displayed in special characters like '* * * ' without unreasonably translating that portion into a target translation language in the conventional language information processing apparatus. In the case of a model phrase like 'My name is "Tom" (the registered portion is shown by double quotation marks),' for example, it becomes 'My name is * * * .' In this case, however, the problem is that what has been registered in the registered portion is left unknown as viewed from the target translation language (English).

(3) A certain combination of registered character string like 'ayu' and 'kya' in Japanese, for example, may not be pronounced; when they are registered, a line boundary character check can be considered so that such a character string is prevented from being input. Notwithstanding, the line boundary character check for use in placing input restrictions requires extremely complicated programs and this would result in raising a problem in that satisfactory input speed is unobtainable because the processing speed of the CPU used in a microcomputer or the like is low.

SUMMARY OF THE INVENTION

An object of the present invention made in view of the forgoing problems is to provide a language information processing apparatus capable of causing a registered character string to be pronounced at least close to what is pronounced in the source translation language even though the registered character string is a character string having a pronunciation peculiar to the source translation language.

Another object of the present invention is to provide a language information processing apparatus capable of preventing a registered character string having no clear meaning from being displayed as a result of translation at least even when the registered character string is displayed in characters peculiar to the source translation language and of having a decision readily made on whether such a registered character string has been registered in the registered portion as the result of translation.

Still another object of the present invention is to provide a language information processing apparatus capable of allowing a registered character string to be input at satisfactory input speed without placing input restrictions even when a character string to be registered is not pronounceable and also allowing the registered character string to be pronounced in a recognizable form at least.

In order to solve the foregoing problems according to aspect 1 of the invention, a language information processing apparatus for translating a model phrase in a first language into a corresponding second language and outputting the translated phrase comprises: display means for displaying the phrase, input means for inputting a character or a word to be added in the first language to the phrase displayed by the display means, first voice information storage means for storing voice information in the second language corresponding to the phrase, second voice information storage means for preparing and storing voice information concerning the character or the word in the first language with an intonation in the first language, which character or word is input by the input means, translation instruction means for instructing the translation of the phrase containing the character or the word in the first language, which character or word has been added by the input means, and voice information read means for reading the voice information in the second language corresponding to the phrase from the first voice information storage means under the instruction from the translation instruction means, and reading the added character or word in the first language from the second voice information storage means.

According to aspect 2 of the invention, a language information processing apparatus as in aspect 1 is such that voice information concerning the character or the word in the first language as stored by the second voice information storage means is prepared with the intonation voiced by a speaker whose native language is the first language.

According to aspect 3 of the invention, a language information processing apparatus as in aspect 1 is such that the display means displays the phrase by clarifying an area in which a character or a word can be added and that the phrase is displayed by adding to the area the character or the word that has been input by the input means.

According to aspect 4 of the invention, a language information processing apparatus as in aspect 3 further comprises: phrase storage means for storing a phrase in the second language corresponding to the phrase in the first language, and phrase read means for reading the phrase in the second language corresponding to the phrase in the first language from the phrase storage means under instructions from the translation instruction means, wherein the display means displays other than the appended character or the appended word out of the phrase in the second language corresponding to the phrase in the first language read by the phrase read means.

In order to solve the foregoing problems according to aspect 5 of the invention, a language information processing apparatus for translating a model phrase in a first language into a corresponding second language and outputting the translated phrase comprises: input means for inputting a character or a word to be added to the phrase in the first language, voice storage means for storing voice information in the second language according to the voice voiced by a speaker whose native language is the second language, character voice storage means for storing voice information corresponding to the character or the word in the first language according to the voice voiced by a speaker whose native language is the first language, translation instruction means for instructing the translation of the phrase with the appended character or the appended word into the second language, voice information read means for reading voice information from the voice storage means with respect to the phrase under instructions from the translation instruction means and reading voice information from the character voice storage means with respect to a portion corresponding to the appended character or the appended word, and voice output means for outputting the voice information read from the voice information read means by means of voice.

In order to solve the foregoing problems according to aspect 6 of the invention, a language information processing apparatus for translating a model phrase in a first language into a corresponding second language and outputting the translated phrase comprises: display means for adding a special symbol to the attachable portion of a phrase to which a character or a word is attachable out of phrases in the first language and displaying the phrase, input means for inputting the character or the word to be added to the phrase displayed by the display means, and translation means for translating a phrase in the first language into the second language, wherein when the character or the word is input by the input means, the display means replaces the special symbol with the character or the word concerned so as to display the replacement and when the phrase in the first language is translated into the second language, the display means displays the phrase thus translated, though the display means translates the character or the word that has been input by the input means but does not display the character or the word thus translated.

According to aspect 7 of the invention, a language information processing apparatus as in aspect 6 is such that the display means replaces with a second symbol the character or the word that has been input by the input means and translated but not displayed.

According to aspect 8 of the invention, a language information processing apparatus as in aspect 6 is such that the display means adds the first symbol to an attachable portion of the phrase that has not been input by the input means but translated by the translation means into the second language.

According to aspect 9 of the invention, a language information processing apparatus as in aspect 6 further comprises: storage means for storing the phrase in the second language by corresponding the phrase in the second language to the phrase in the first language, and translation instruction means for instructing the translation of the phrase in the first language, wherein the translation means reads the phrase in the second language corresponding to the phrase in the first language from the storage means under instructions from the translation instruction means.

In order to solve the foregoing problems, a language information processing apparatus comprises: display means for displaying a phrase to which a character or a word can be added, input means for inputting a character or a word to be added to the phrase display by the display means, and voice output means for outputting the phrase with voice, wherein the display means for displaying the phrase containing an attachable portion out of the phrases and irrespective of the fact that whether the character or the word that has been input by the input means is pronounceable, adding the character or the word concerned to the phrase and displays the phrase, and wherein the voice output means does not output with voice the character or the word displayed by the display means out of those displayed thereby.

According to aspect 11, a language information processing apparatus as in aspect 10 is such that the display means displays the attachable portion in the phrase by adding a special symbol thereto and irrespective of the fact that whether the character or the word that has been input by the input means is pronounceable, replaces the character or the word concerned with the special symbol and displays the symbol.

According to aspect 1 of the invention, the input means inputs the character or the word to be added in the first language to the phrase in the first language displayed by the display means. The first voice information storage means stores the voice information in the second language corresponding to the phrase in the first language. Further, the second voice information storage means stores voice information concerning the character or the word in the first language that is input by the input means with the intonation in the first language. When the translation instruction means instructs the translation of the phrase containing the character or the word in the first language that has been added by the input means, the voice information read means reads the voice information in the second language corresponding to the phrase from the first voice information storage means and also reads the voice information concerning the character or the word in the first language added from the second voice information storage means. Therefore, even though the character or the word is a character string having pronunciation peculiar to the first language as a result of the fact that the phrase in the first language is translated into the second language, it is possible to voice the appended character or the appended word with the intonation in the first language as at least a source translation language.

According to aspect 5 of the invention, the input means inputs the character or the word in the first language to be added to the phrase in the first language. The voice storage means stores the voice information in the second language according to the voice voiced by the speaker whose native language is the second language. Further, the character voice storage means stores the character or the word in the first language according to the voice voiced by the speaker whose native language is the first language. When the translation instruction means instructs the translation of the phrase with the appended character or the appended word into the second language, the voice information read means reads the voice information from the voice storage means with respect to the phrase and also reads the voice information from the character voice storage means with respect to the portion corresponding to the appended the character or the appended word. The voice output means outputs the voice information read from the voice information read means with voice. Therefore, even though the character or the word is a character string having pronunciation peculiar to the first language as a result of the fact that the phrase in the first language is translated into the second language, it is possible to voice the appended character or the appended word with the voice in the first language as at least a source translation language.

According to aspect 6 of the invention, the display means displays the phrase by attaching the first special symbol to the attachable portion out of the phrases to which the character or the word is attachable in the first language. The input means inputs the character or the word to be added to the phrase displayed by the display means. When the input means inputs the character or the word, the display means normally replaces the first symbol with the character or the word concerned and displays the result. When the phrase in the first language is translated by the translation means into the second language, the display means displays the translated phrase but does not display the character or the word that has been input by the input means. Therefore, it is possible to prevent at least an unclear character string from being displayed as a result of translation even when the character or the word thus input is displayed with the character peculiar to the source translation language.

According to aspect 10 of the invention, the display means display the phrase to which the character or the word is attachable. The input means inputs the character or the word to be added to the phrase displayed by the display means. The display means displays the phrase containing an attachable portion out of other phrases and also displays the phrase with the character or the word added thereto, irrespective of the fact that the character or the word that has been input by the input means is pronounceable. Further, the voice output means features that it does not voice the character or the word that has been displayed by the display means but not pronounceable. Therefore, it is possible to input any character or word which is unpronounceable without input restrictions at satisfactory speed and voice such a character or a word in a recognizable mode at least.

BRIEF DESCRIPTION OF THE DRAWINGS

FIGS. 3A and 3B are conceptual diagrams illustrating the data structure of phrase data and that of voice data for use in voicing the phrase data.

FIGS. 4A and 4B are conceptual diagrams illustrating the data structure of noun data and that of character voice data for use in voicing the noun data.

FIGS. 5A and 5B are conceptual diagrams illustrating tables of katakana characters showing whether two characters can be pronounced with one sound.

DETAILED DESCRIPTION OF THE PREFERRED EMBODIMENTS

An embodiment of the present invention will subsequently be described by reference to the accompanying drawings.

A. Constitution

Figure 1:
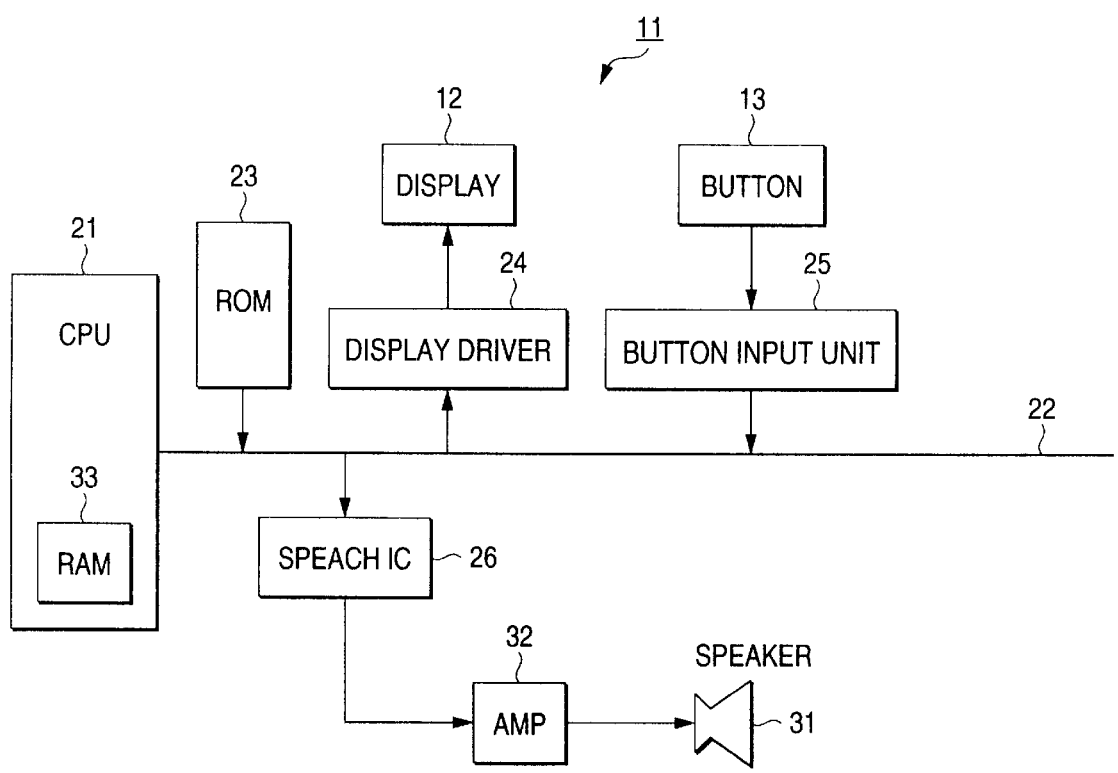
FIG. 1 is a block diagram of a language information processing apparatus embodying the present invention.

FIG. 1 is a block diagram of a language information processing apparatus embodying the present invention. This language information processing apparatus 11 shown in FIG. 1 is an apparatus developed for use in language-to-language communication and designed to display a designated phrase in a designated language on a liquid crystal display 12 added to the body out of the Japanese, English and Chinese phrases in combination stored therein. Moreover, such a designated model phrase in the designated language is voiced from a speaker 31 as occasion demands.

The language information processing apparatus 11 is also equipped with a CPU (Central Processing Unit) 21 which performs basic control functions. The CPU 21 stores phrase numbers for use in designating a specific model phrase out of the various phrases stored in a ROM (Read Only Memory) 23, which will be described later, and has a RAM (Random Access Memory) 33 for performing various operations. Further, the CPU 21 is connected via a system bus 22 to the ROM 23, a display driver 24, a button input unit 25 and a speech IC 26.

The ROM 23 is a memory for storing a program for use in controlling the language information processing apparatus 11, various phrases and besides voice output data. The display driver 24 is a drive circuit for displaying, for example, Japanese, English and Chinese model phrases and any other predetermined data. The button input unit 25 is a circuit for retrieving input data from key buttons 13 including a set button 13-1, a menu button 13-2, a vertical-horizontal button 13-3, a language conversion button 13-4, a voice button 13-5, a replacement button 13-6, a power supply switch 13-7 and so forth.

The speech IC 26 is an integrated circuit for outputting voice signals based on the voice data stored in part of the ROM 23 in accordance with each model phrase. The voice signal from the speech IC 26 is amplified by an amplifier 32 before being output from the speaker 31.

When it is desired to communicate with a person in a remote area with voice, smooth communication is made possible simply by connecting the voice output from the speaker 31 to a telephone receiver.

B. Operating Panel

Figure 2:
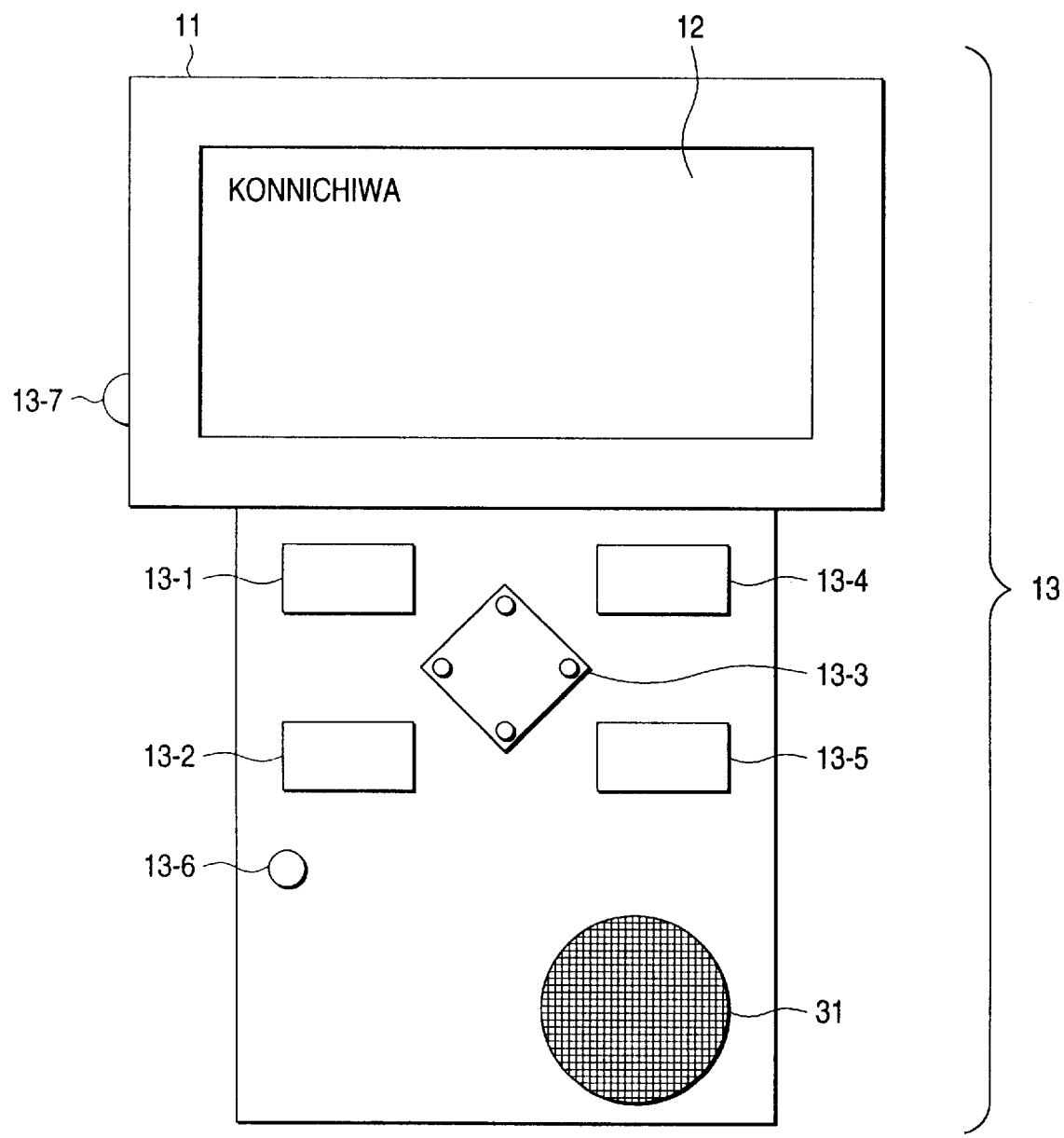
FIG. 2 is an exemplary diagram showing the operating panel of the language information processing apparatus.

FIG. 2 is an exemplary diagram showing the operating panel of the language information processing apparatus according to this embodiment of the invention. In this case, like reference characters designate like or corresponding component parts of FIG. 1 and the description thereof will be omitted. The key buttons 13 including various switch-buttons are arranged in the body: namely, a set button 13-1, a menu button 13-2, a vertical-horizontal cursor button 13-3, a language conversion button 13-4, a voice button 13-5, a replacement button 13-6 and a power supply switch 13-7. The set button 13-1 is used for deciding noun data to be registered in a model phrase. The vertical-horizontal cursor button 13-3 is used for scrolling a screen and a cursor that are displayed on the display 12 vertically and horizontally. The language conversion button 13-4 is used for instructing the translation of the displayed phrase into a target translation language. The voice button 13-5 is used for instructing the voicing of the displayed phrase via the speaker 31. The replacement button 13-6 is used for instructing the alteration of the noun data. Further, the power supply switch 13-7 is used for the on-off switching of the power supply.

C. Data Structure

C-1. Phrase Data

Phrase data to be stored in the ROM 23 is classified according to a number of categories, that is, those of cities, transportation, restaurants and the like. FIG. 3A shows the structure of Japanese phrase data and that of English phrase data in one category. The addresses of Japanese phrase data 61 and English phrase data 63 are stored at a Japanese phrase data address 60 and an English phrase data address 62, respectively.

The leading address 66 of the English phrase data address 62 is set 1,000 h (h=hexadecimal number) times as great as the leading address "a" 64 of the Japanese phrase data address 60. Each of the phrase data addresses 64, 68, 72 in the Japanese phrase data address 60 is incremented by one. Each of the phrase data addresses 66, 70, 74 in the English phrase data address 62 is also incremented by one likewise.

Therefore, each English phrase data address is obtained by multiplying the leading address "a" 64 of the Japanese phrase data address 60 by 1,000 h and further adding a relative address (offset value) add from the leading address. Since it is possible to readily calculate one of the Japanese phrase data address 60 and English phrase data address 62 from each other, the language in the phrase can readily be changed from one to another.

The mark '&' in the beginning of a model phrase in each of the Japanese and English phrase data indicates a noun registration phrase in which any desired noun can be registered by the user. The '* * *' portion shown in FIG. 3A is equivalent to a registered noun data (character or word). Incidentally, the '* * *' shows that nothing has been registered and is directly displayed in that portion during the translation process. When certain noun data has been registered, moreover, a '###' is displayed.

The phrase data and voice data for use in voicing the phrase data are linked together and as shown in FIG. 3B, the address 70 of Japanese voice data 71 is obtained by multiplying the leading address of the Japanese phrase data address 60 by 2,000 h and further adding a relative address add. In other words, the Japanese voice data address 70 is equal to a ×2,000 (h). The address 72 of corresponding English voice data 73 is obtained by multiplying the leading address of the Japanese phrase data address 60 by 3,000 h and further adding a relative address add. In the above noun registration phrase examples, that is, in reference to the Japanese voice data 71 and the English voice data 73, 'Watashiwa' in the first half portion and 'moushimasu' in the second half portion are stored in a portion corresponding to, for example, 'Watashiwa * * * to moushimasu' where any given noun is registered by the user, whereas 'My name is' is stored in a portion corresponding to 'My name is * * *' but voiceless data 76 is also stored because no voice exists in the second half portion.

C-2. Noun Portion Data and Character Voice Data

FIG. 4A is a conceptual diagram indicating a data configuration of the characters or word registered by the user in the above noun registration phrase. In FIG. 4A, it has been arranged according to this embodiment of the invention that the registered noun data is stored character-to-character successively from a leading address n and any given katakana data up to 20 characters is registrable.

FIG. 4B is a conceptual diagram indicating a data configuration of character voice data for the voicing of the noun data registered by the user. In FIG. 4B, the voice data on the basis of each character registrable by the user is stored character-to-character successively from a leading address m. Since Japanese is made a target translation language in this case, the Japanese syllabary including 50 sounds of 'a', 'i', . . . 'un' is stored.

C-3. Table of Katakana Characters

FIG. 5 is a conceptual diagram indicating a table of katakana characters showing whether two characters are pronounced with one sound as a character is linked with any one of the preceding characters (katakana) constituting noun data. In a case where an unpronounceable character string has been registered when the noun data registered by the user is voiced according to this embodiment of the invention, the character string is voiced like what is as pronounceable as possible. Thus the table of katakana characters shown in FIG. 5A is prepared beforehand and by referring to the table of katakana characters, it is decided whether two characters with one character in the table being linked with the other following character are pronounced with one sound. In FIG. 5A, each character with a background of white color shows that when the character is followed by a predetermined character, it is combined with the following one and thus the two characters are pronounced with one sound. On the other hand, the characters with a hatching background are those to be individually pronounced.

In reference to the above table of katakana characters, 'a', for example, is obviously a character which is never pronounced with one sound even if it is combined with another character. Further, 'ki' may be a character which is pronounced with one sound when it is combined with a certain character; for example, it is pronounced like 'kya', 'kyu' and 'kyo' when it is followed by 'ya', 'yu' and 'yo'.

C-4. Table of Character Strings in Cases where Two Characters are Pronounced with One Sound FIG. 5B is a diagram indicating a table of character strings in cases where two characters are pronounced with one sound. When it is decided whether two characters with one character in the above table of katakana characters being linked with the other following character may be pronounced with one sound, it is further decided whether the preceding character in the combination of two is certainly a leading character of a character string with two characters being pronounced with one sound. In other words, if a character string forming noun data exists in the table, it is decided to be what is pronounced with one sound and if it does not exist therein, it is decided to be what is not pronounced with one sound.

When there is a character string 'kya' as what forms noun data, for example, it is found to be a character string with two characters to be pronounced with one sound by reference to the table of character strings and therefore the character string is pronounced like 'kya' in this case. If, however, there is a character string 'kia', for example, it is found to be a character string that is unpronounceable with one sound. In this case, the leading character 'ki' is simply pronounced like 'ki' and the following 'a' is not voiced.

D. Operation of the Embodiment

A description will subsequently be given of the operation of the language information processing apparatus according to this embodiment of the invention. FIGS. 6 to 11 are flowcharts explanatory of the operation of the language information processing apparatus.

(1) Process of Selecting Model Phrase Data

Figure 6:
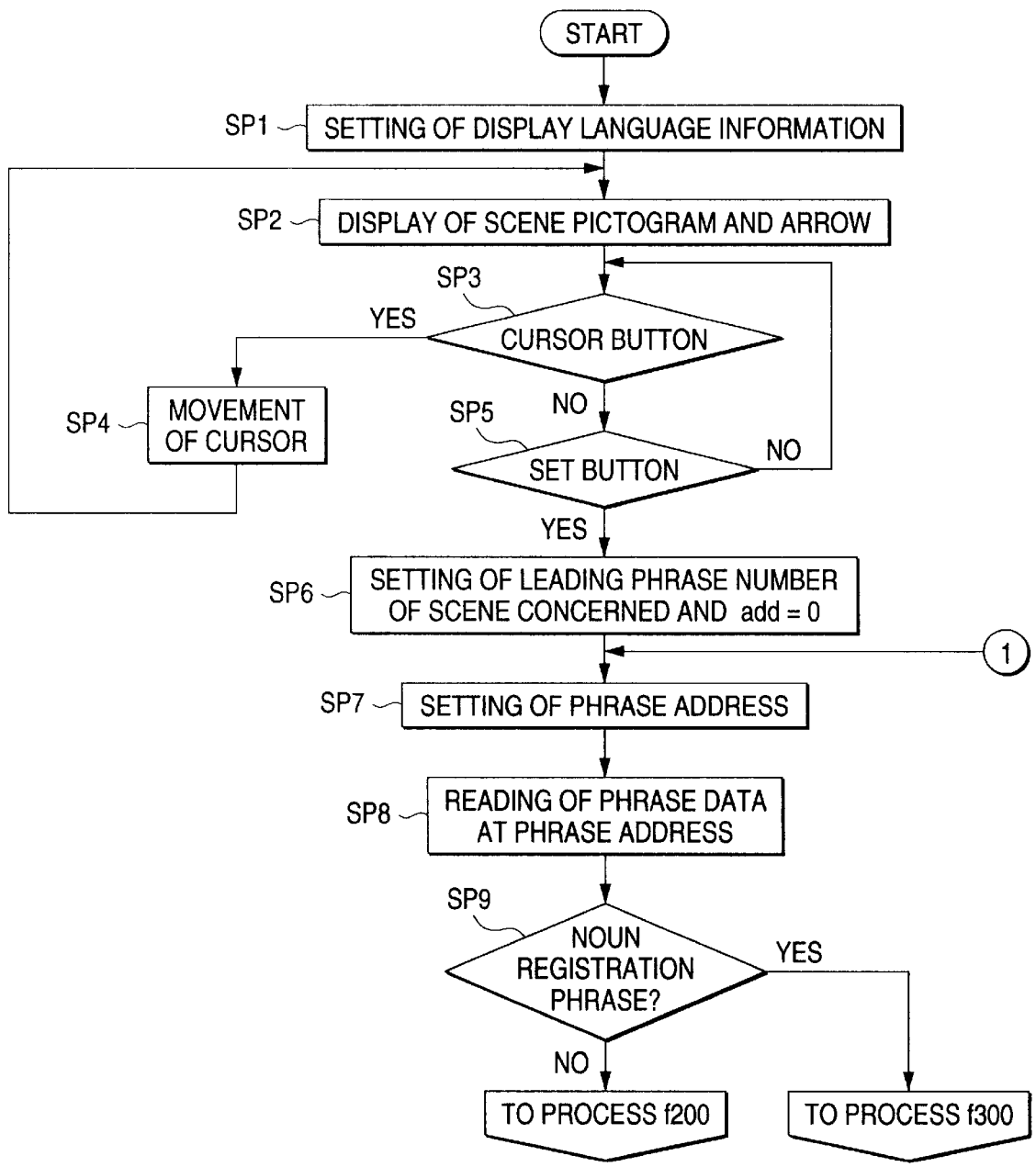
FIG. 6 is a flowchart explanatory of the operation of the language information processing apparatus.

When power is supplied to the apparatus, display language information at the rise-up time of the power supply is set at Step SP1 of FIG. 6. Because of Japanese-to-English translation in this case, a value indicative of 'Japanese' is set. At Step SP2 subsequently, scene pictograms and an arrow (cursor) are displayed on the display 12. By the pictogram is meant that a model phrase to be used in a certain situation is expressed by means of a 'house,' an 'automobile' or the like. According to this embodiment of the invention, various scene pictograms are arranged in 3 lines and 5 rows and a scene pictogram name (e.g., character string of 'basic conversation,' etc.) summarizing the displayed scene pictograms is displayed in the upper portion. In the initial state of a selective screen, the cursor is positioned in the scene pictogram at the upper left corner.

At Step SP3, a decision is made on whether the cursor button 13-3 has been depressed and at Step SP5, a decision is made on whether the set button 13-1 has been depressed. When the cursor button 13-3 and the set button 13-1 have not been depressed, the execution of Step SP3 and Step SP5 is repeated and a standby condition is maintained until either button is depressed.

Step SP4 is then followed when the cursor button 13-3 is depressed and at Step SP4, the cursor is moved vertically and horizontally in accordance with the position where the cursor button 13-3 is depressed so as to return to Step SP2. The user who is watching the display 12 moves the cursor up to the side of a desired scene pictogram and depresses the set button 13-1.

Step SP6 is then followed when-the cursor button 13-3 is depressed to set the leading address of a model phrase corresponding to the scene pictogram concerned. Assuming that self-contained model phrase data is the data shown in FIG. 3A when the language at the rise-up time is Japanese, for example, "a" of the shown by the Japanese phrase address becomes the value of a leading phrase address. Further, the value of a relative address add from the leading address is simultaneously set to '0'.

At Step SP7, the value of the leading phrase address is added to the value of the relative address add so as to set a phrase address (=leading phrase address+add). At Step SP8, the phrase data indicated by the value of the phrase address, that is, phrase data 'konnichiwa' is read out.

Figure 7:
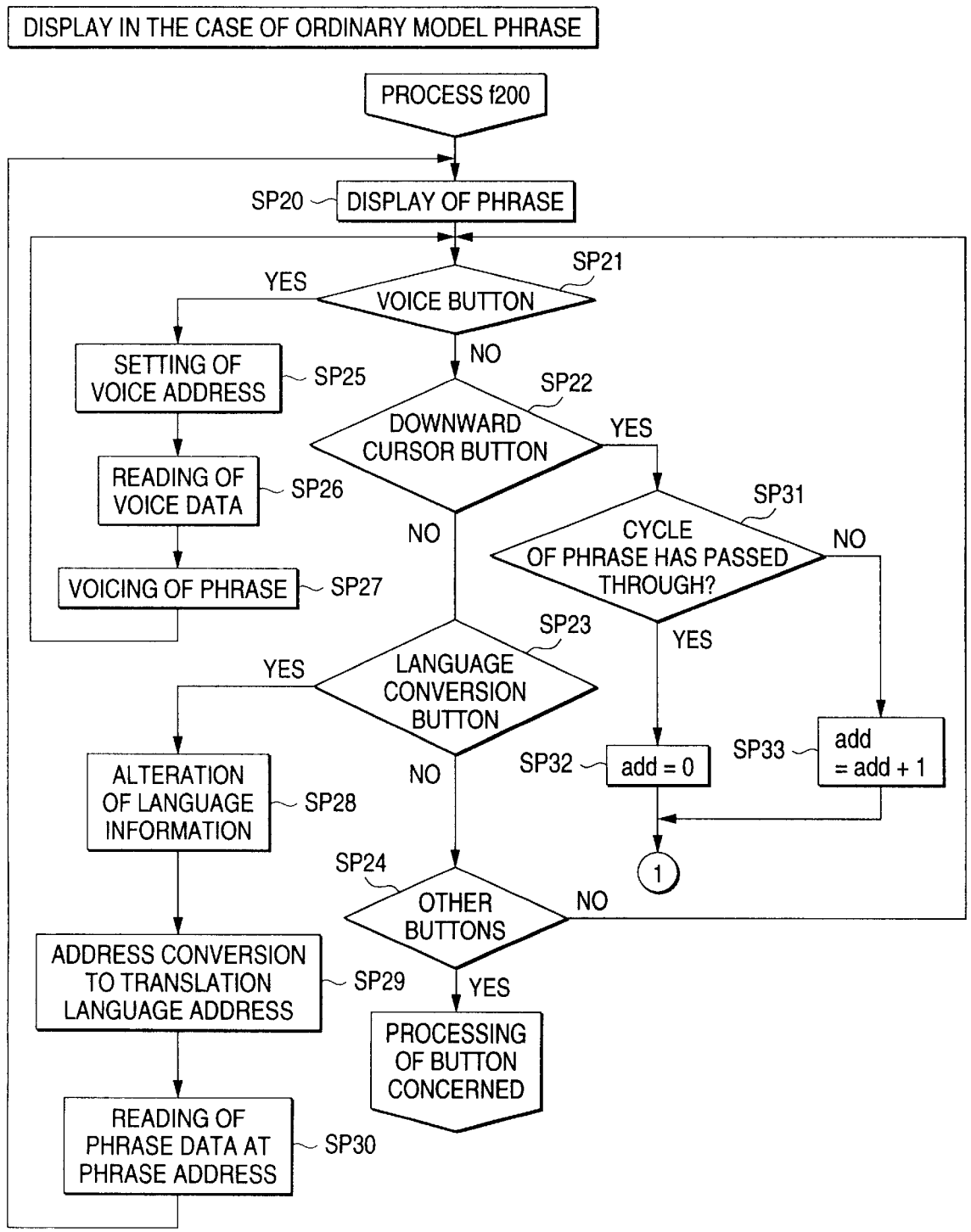
FIG. 7 is a flowchart explanatory of the operation of the language information processing apparatus.
Figure 8:
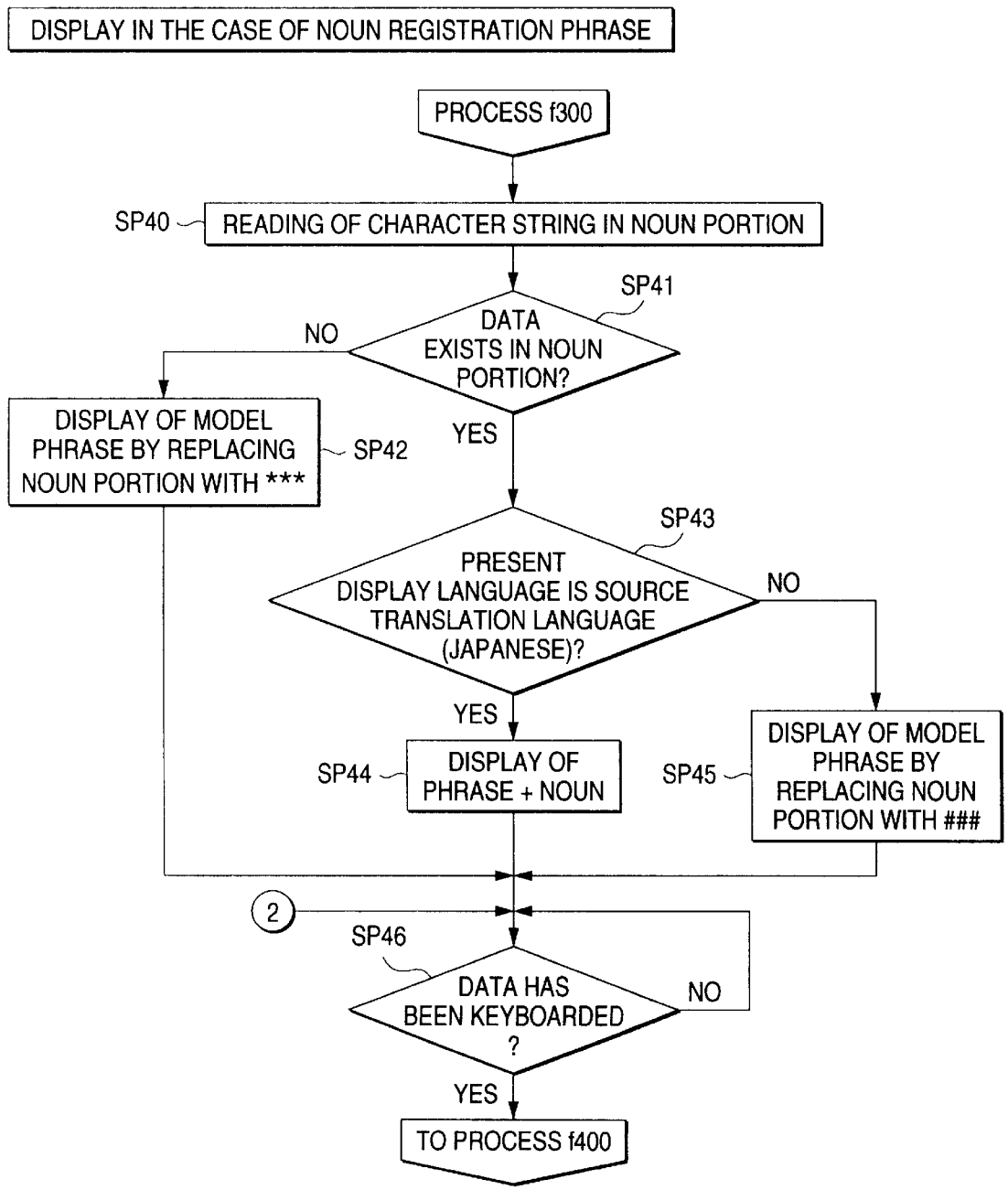
FIG. 8 is a flowchart explanatory of the operation of the language information processing apparatus.

At Step SP9, a decision is made on whether the phrase data that has been read out is a noun registration phrase in which any given character is registrable in a predetermined portion and if it is not such a noun registration phrase, Step SP20 shown in FIG. 7 is followed and if it is the noun registration phrase, Step SP40 shown in FIG. 8 is followed. Since 'konnichiwa', for example, is not a noun registration phrase, Step SP20 of FIG. 7 is followed.

(2) Non-Noun Registration Phrase.

When the phrase data that has been read out is a non-noun registration phrase, the phrase data is displayed on the display 12 at Step SP20 of FIG. 7. At Steps SP21–SP24, a decision is made on whether the voice button 13-5, the downward cursor button 13-3, the language conversion button 13-4 or any other button has been operated. If any one of these buttons is not operated, the display concerned is continued. When any one of these button is operated, a process corresponding to the operation of the button is performed. Processes to be performed according to the buttons thus operated will subsequently be described.

a. Voice Button

When the voice button 13-5 is depressed, Step SP25 is followed from Step SP21 and a voice address is set. The voice address is, as described above, obtainable by multiplying the leading phrase address by 2,000 h and further adding the relative address add. At Step SP26, the voice data 'konnichiwa' stored at the voice address is read out, and output from the speaker 31 at Step SP27, whereby 'konnichiwa' is voiced.

b. Language Conversion Button

When the language conversion button 13-4 is depressed, Step SP28 is followed from Step SP23 and language information is altered. Since Japanese-to-English translation is made according to this embodiment of the invention, conversion to English is carried out. At Step SP29, conversion to an English phrase address is carried out by multiplying the leading address of the Japanese phrase by 1,000 (h) and further adding the relative address add. At Step SP30, the English phrase data stored at the English phrase address is read out so as to return to Step SP20. The 'Hello' is read from the Japanese phrase data 'konnichiwa', for example. The same process is performed in English at Step SP20 and thereafter. At Step SP20, for example, the English phrase data is displayed on the display 12. When the language conversion button 13-4 is depressed, voice data corresponding to the English phrase data is read out and an English version is voiced from the speaker when the voice button 13-5 is depressed.

c. Downward Cursor Button.

When the downward cursor button 13-3 is depressed, Step SP31 is followed from Step SP22. At Step SP31, a decision is made on whether a cycle of phrase has been completed, that is, the last phrase data shown in FIG. 3A has been reached. When a cycle of phrase has been completed, the relative address add is made '0' at Step SP32 to restore the leading phrase data, whereas when that cycle has not been completed, the relative address add is incremented by '1' at Step SP33 to advance the phrase data.

When the process relative to the operation of the downward cursor button 13-3 is terminated, Step SP7 of FIG. 6 is followed again. As described above, the phrase address (=leading phrase address+add) is set at Step SP7; the phrase data at the address indicated by the value of the phrase address is read out at Step SP8; and a decision is made on whether the phrase data thus read is a noun registration phrase at Step SP9.

d. Other Buttons

When the buttons other than the voice button 13-5, the downward cursor button 13-3 or the language conversion button 13-4 are operated, Step SP34 is followed from Step SP24 and any process corresponding to the depressed button is performed.

(2) Noun Registration Phrase.

A description will subsequently be given of a case where the phrase data that has been read is a noun registration phrase. While the above process is performed, 'I&watashiwa * * * to moushimasu' is read out as phrase data at Step SP8 when the phrase address becomes a+add (1) by operating the downward cursor button 13-3. Although a decision is made on whether a noun registration phrase is established at Step SP9 as described above, '&' indicative of such a noun registration phrase has been added to the leading end of the sentence '&watashiwa * * * to moushimasu,' so that Step SP40 of FIG. 8 is followed.

At Step SP40, a character string of the noun data portion of phrase data (portion in which a character or a word is registered by the user) is read out and at Step SP41, a decision is made on whether it contains noun data. If the noun data is '* * * ', Step SP42 is followed because nothing has been registered in this case and the noun data portion is made '* * * ' and displayed on the display 12.

Assuming no data has been registered in the noun portion, for example, 'Watashiwa * * * to moushimasu' is displayed when the display language is Japanese. When the display language is English, moreover, 'My name is * * * ' is displayed. Therefore, the user is able to know that nothing has been registered since '* * * ' is displayed in the noun portion.

Whereas when noun data 'yayomucha' has been registered in the noun portion as shown in FIG. 4A, for example, Step SP43 is followed from Step SP41 and a decision is made on whether the present display language is the source translation language (Japanese in this case). When the present display language is the source translation language, Step SP44 is followed and 'Watashiwa yayomucha to moushimasu' is displayed on the display 12, that is, there is established a state in which the noun portion in the phrase has been filled up. When the present display language is English, Step SP45 is followed from Step SP43 and the noun portion is changed to '###', that is, 'My name is ###' is displayed, whereby a certain noun data has been registered in the noun portion as viewed from English.

Figure 9:
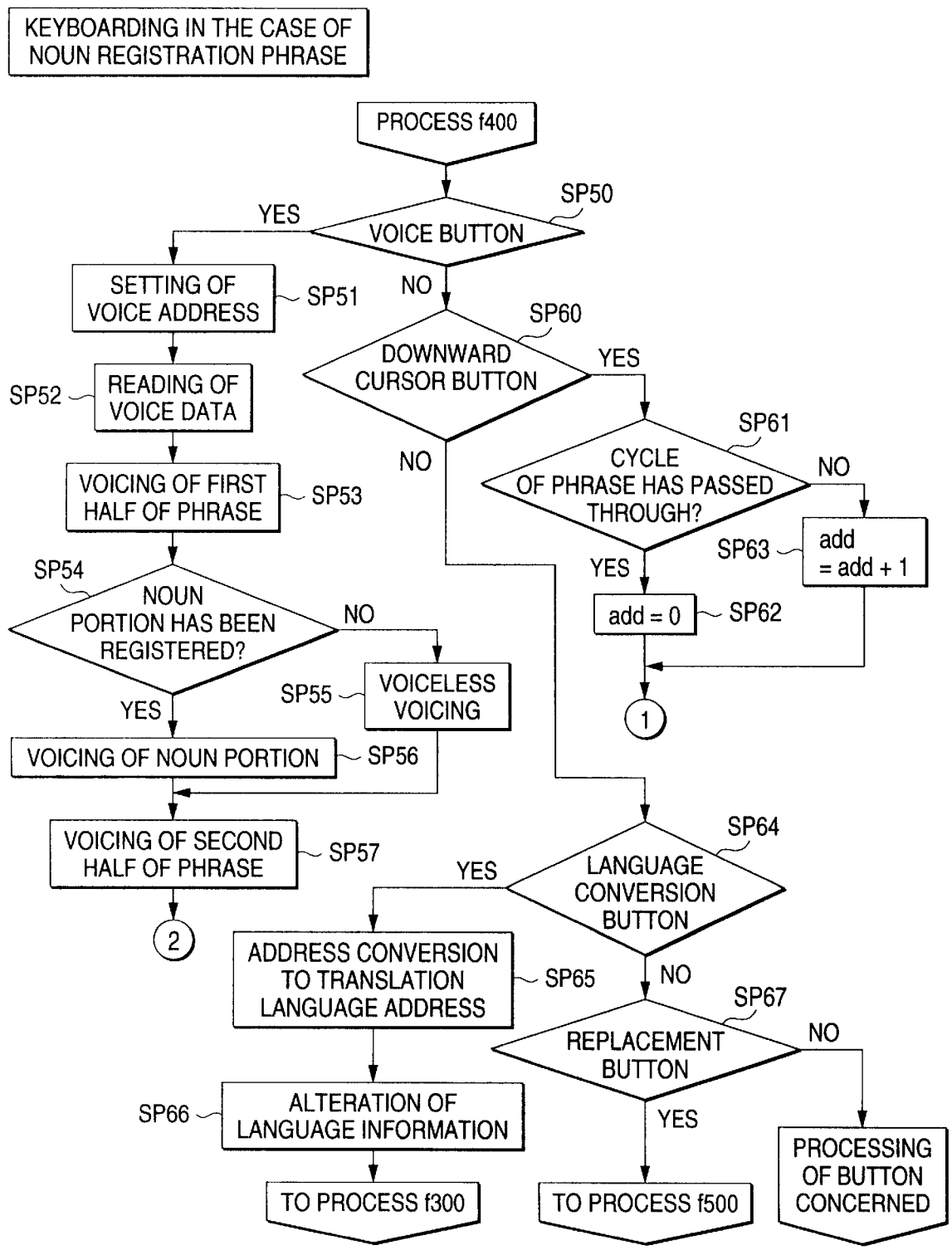
FIG. 9 is a flowchart explanatory of the operation of the language information processing apparatus.

The phrase data is continuously displayed at Steps SP42, SP44, SP45 as described above until any information is newly keyboarded. When any information is then keyboarded newly, the process concerned is terminated and Step SP50 of FIG. 9 is followed.

(3) Keyboarding Process at the Display of Noun Registration Phrase.

A description will subsequently be given of a process during the time information is keyboarded during the time phrase data is displayed with the phrase data being a noun registration phrase. In the case of such a process, a decision is made on whether one of the voice button 13-5, downward cursor button 13-3, language conversion button 13-4 and replacement button 13-6 has been depressed when any information is keyboarded at Steps SP50, SP60, SP64 or SP67 and the process corresponding to the button thus depressed is performed. The processes corresponding to the buttons depressed will subsequently be described in sequence.

a. Voice Button

When the voice button 13-5 is depressed, Step SP51 is followed from Step SP50 and like ordinary phrase data, a voice address (=a×2,000 (h)+1) based on the address of the phrase data is set and the voice data stored at the voice address is read at Step SP52. At Step SP53, the speaker is used to output the voice data on the first half of the phrase. This is because the voice data on the noun registration phrase is stored as shown in FIG. 3B in that the first half portion and second half portion situated in the rear of a noun portion are separately stored with the noun portion registered by the user as a boundary, so that the combination of the phrase data and the noun data is voiced. When the display language is Japanese, for example, 'watashiwa' is voiced, whereas when it is English, 'My name is' is voiced.

At Step SP54, a decision is made on whether the noun portion of the phrase data (character or word) has been registered and when it has not been registered, Step SP55 is followed, at which step silence is kept. At Step SP57, the second half voice data on the phrase is output from the speaker. When the display language is Japanese, '. . . to moushimasu (. . . refers to silence)' is voiced, so that 'Watashiwa . . . to moushimasu' in total is voiced. When the display language is English, moreover, silence is kept in the second half portion and 'My name is . . . ( . . . refers to silence)' in total is voiced.

Whereas when the noun data 'yayomucha' has been registered in the noun portion as shown in FIG. 4A, Step SP56 is followed from Step SP54. At Step SP56, the speaker is used to output only voice data which allows the noun portion to be pronounced in accordance with a voice process, which will be described later. Therefore, 'yamucha' is voiced as the noun data in this case. A detailed description will be given of the process of voicing the noun portion later. Then Step SP57 is followed and voice data on the second half of the phrase is output from the speaker. As a result, 'Watashiwa yamucha to moushimasu' is voiced when noun data has been registered in the noun portion. When the display language is English, moreover, 'My name is yamucha (only the yamucha is voiced with Japanese intonation)' is voiced (aspect 2). When the noun portion is voiced according to the voice data voiced by a speaker whose mother language is Japanese, the pronunciation of the noun portion becomes the same as that in the source translation language (aspect 5). Assuming the noun portion is voiced mechanically in accordance with synthesis by rule, the then intonation is voiced according the Japanese as the source translation language, whereby the noun phrase is pronounced close to what is in the source translation language (aspect 1). When the voicing of the phrase data is terminated, Step SP46 of FIG. 8 is followed again, so that the presence or absence of keyboarding is decided.

b. Downward Cursor Button

When the downward cursor button 13-3 is depressed, Step SP61 is followed from Step SP60 and a decision is made on whether a cycle of phrase has been completed, that is, the last phrase data shown in FIG. 3A has been reached. When a cycle of phrase has been completed, the relative address add is made '0' at Step SP62 to restore the leading phrase data, whereas when that cycle has not been completed, the relative address add is incremented by '1' at Step SP33 to advance the phrase data. Thus the phrase data is advanced to the next data in sequence.

c. Language Conversion Button

When the language conversion button 13-4 is depressed, Step SP65 is followed from Step SP64 and conversion to an English phrase address is established by multiplying the leading address of the Japanese phrase by 1,000 (h) and further adding the relative address add. At Step SP30, the language information is altered. Since Japanese-to-English translation is made according to this embodiment of the invention, conversion to English is carried out. Then Step SP40 of FIG. 8 is followed again and the above process after Step SP40 is performed. Therefore, the English phrase data is processed similar thereafter.

d. Replacement Button

Figure 10:
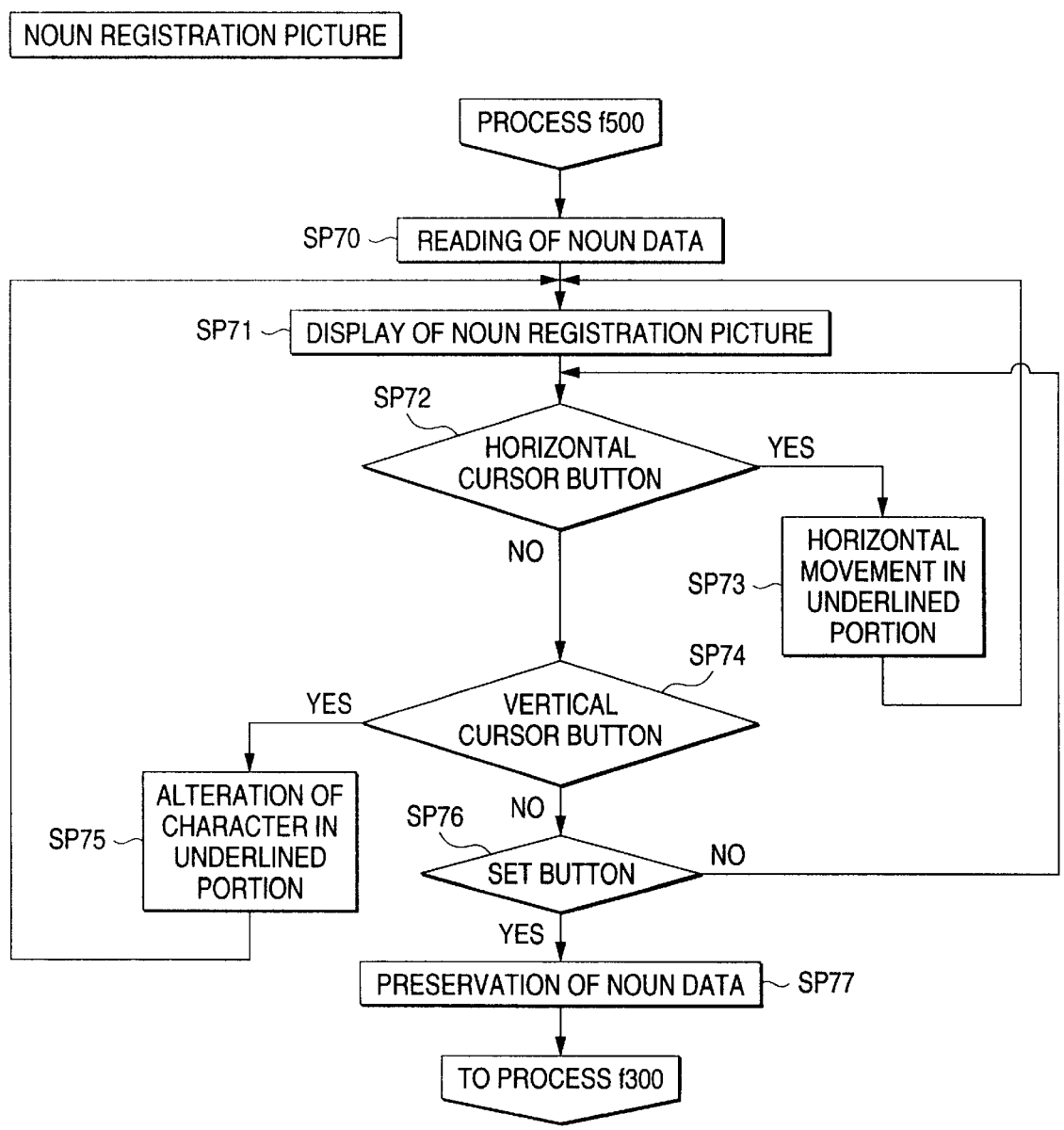
FIG. 10 is a flowchart explanatory of the operation of the language information processing apparatus.
Figure 12A:
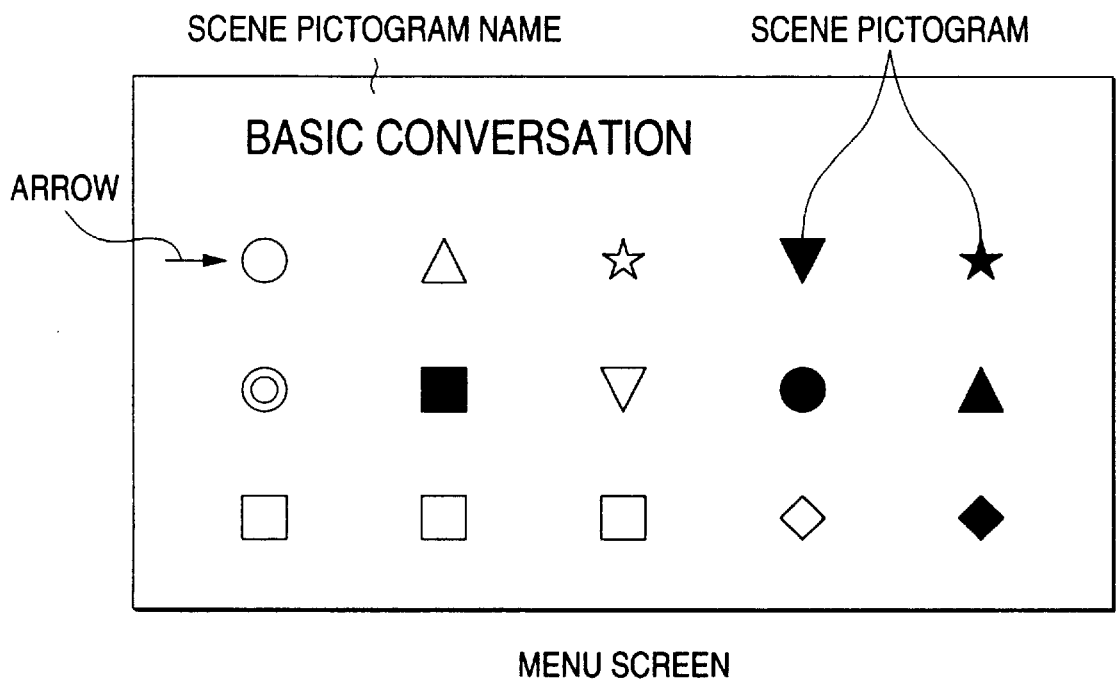
FIGS. 12A and 12B are exemplary diagrams illustrating a display at the time phrase data is selected and what illustrate a display at the time a noun is registered.
Figure 12B:
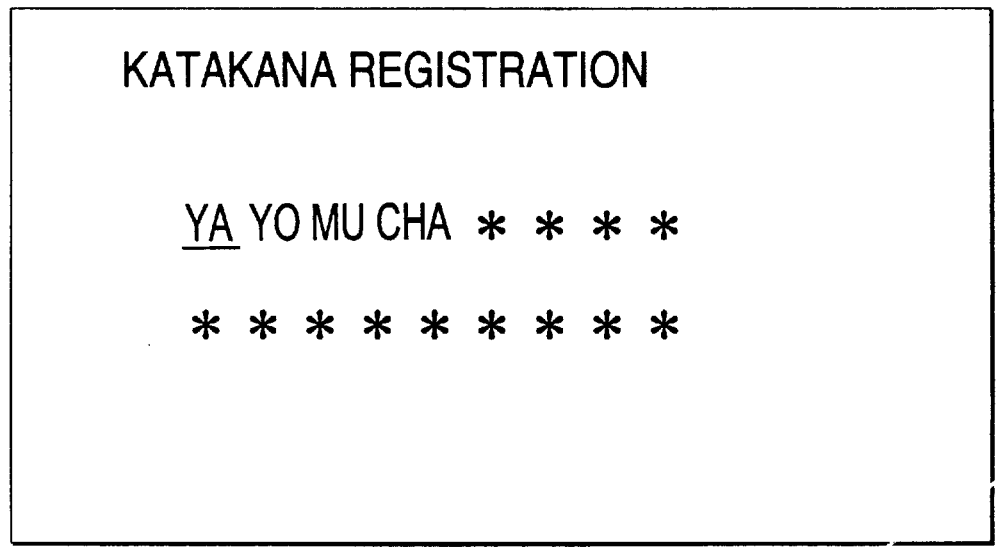

When the replacement button 13-6 is depressed, Step SP70 of FIG. 10 is followed from Step SP67 and data on the noun portion is read out. At Step SP71, the noun registration picture shown in FIG. 12B is displayed on the display 12. On the noun registration phrase picture, data on the noun portion ('yayomucha' in this case) and the lead character with an underline (cursor indicative of input•modification position) is displayed.

At Step SP72, a decision is made on whether the horizontal cursor button 13-3 has been depressed and at Step SP74, a decision is also made on whether the vertical cursor button 13-3 has been depressed and further at Step SP76, a decision is made on whether the set button 13-1 has been depressed. When any one of these buttons has not been depressed, Step SP72 is followed again from Step SP76 and Steps SP72, SP74 and SP76 are repeatedly followed.

When the horizontal cursor button 13-3 is depressed in that case, Step SP73 is followed and the underline is moved left and right in accordance with the operation concerned to move the input•modification position of the character. When the vertical cursor button 13-3 is depressed, Step SP75 is followed to alter the underline position of the character is altered.

When the vertical cursor button 13-3 is depressed, the alteration of the character is made by scrolling the character in the order of the Japanese syllabary including 50 sounds of katakana in the underline position and stopping the scrolling at a point of time the vertical cursor button 13-3 is parted. When the vertical scroll button is parted, the above Step SP71 is followed again and an altered character string is displayed.

The user inputs•alters a noun data having a desired character string by operating the horizontal and vertical cursor button 13-3 and depresses the set button 13-1 after the termination of inputting the desired character string.

When the set button 13-1 is depressed, Step SP77 is followed from Step SP76 and the noun data displayed on the display 12 is retained character-to-character as shown in FIG. 4A. Then Step SP40 of FIG. 8 is followed again, so that the above process is repeated.

(4) Noun Data Voicing Process

Figure 11:
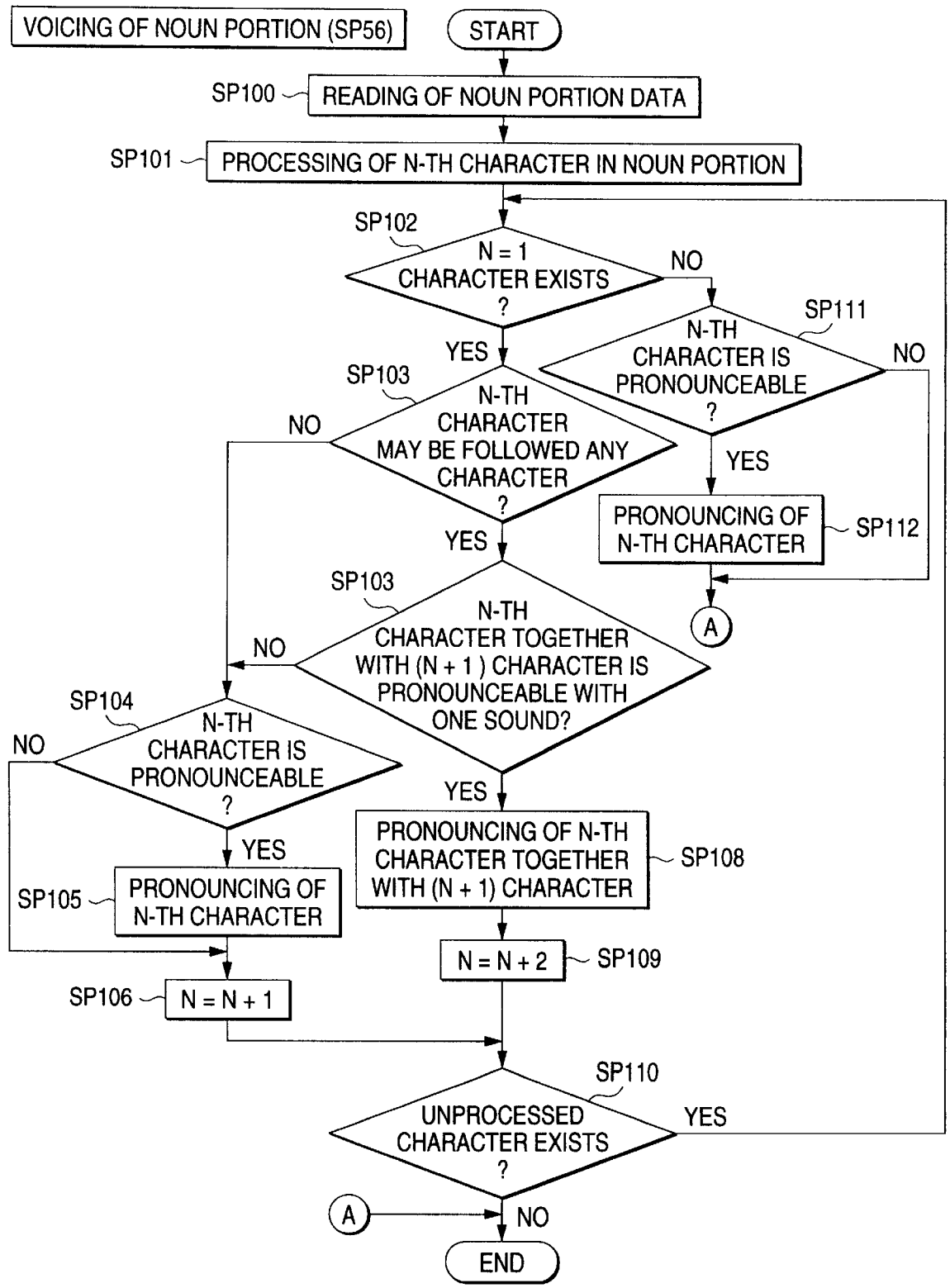
FIG. 11 is a flowchart explanatory of the operation of the language information processing apparatus.

A description will subsequently be given of the process of voicing the above noun portion by reference to FIG. 11. When noun data has been registered in the noun portion of phrase data, the noun data registered in the noun portion is read out at Step SP100 and a variable N indicating which one of the characters of the noun data is being processed is set to '1' at Step SP101 in order to have the noun data properly voiced.

At Step SP102, a decision is made on whether a character to be processed is followed by another character, that is, whether No. N+1 character exists in the noun portion; this is intended to decide the presence of a character string with two characters to be pronounced with one sound such as 'sha', 'shu' and 'sho'. In this case, because of N=1, it is equal to making a decision on whether the second character exists and when data concerning 'yayomucha' has been registered as shown in FIG. 4A, for example, the presence of the second character (yo) causes Step SP103 to be followed.

At Step SP103, a decision is made on whether it is possible for the Nth character to be followed by something, that is, whether the character is combined with the following one so that the two characters may be pronounced like what has one sound. This decision is implemented by referring to the table of katakana characters shown in FIG. 5A. In the above example, the first character 'ya', for example, is a character of the sort that even though it is followed by another character, it is never pronounced with one sound by reference to the table of katakana characters, that is, it is a character to be pronounced separately or otherwise only to be thus pronounced, so that Step SP104 is followed.

At Step SP104, a decision is made on whether the Nth character is pronounceable. For example, 'a', 'i' and 'yo' are characters that cannot be pronounced separately. The above decision on whether a character is pronounceable should be made by reference to the table of katakana characters shown in FIG. 5A. If it is pronounceable separately, Step SP105 is followed and voice data corresponding to the Nth character is read from the voice data table before being output from the speaker. In the above example, 'ya' is directly pronounced since it is pronounceable separately. Incidentally, the address of the character voice data is obtainable from a character species as characters are arranged in the predetermined order.

At Step SP106, the variable N is incremented by '1' so as to process the next character with respect to the noun data and then Step SP110 is followed. At Step SP110, a decision is made on whether any character is left unprocessed as prescribed in the noun data and if there exists a character which is left unprocessed, Step SP102 is followed again, at which step the next character (N+1 character) is subjected to the pronunciation process.

In reference to the data concerning 'yayomucha', for example, the second character 'yo' is subjected to the pronunciation process. At Step SP103, a decision is made on whether the second character 'yo' is followed by any other character so that the combination of characters is pronounced with one sound. Since 'yo' in this case is not linked with any character nor separately pronounceable, Steps SP103, SP104 and SP106 are followed and the variable N is incremented successively, whereby the following character is subjected to the pronunciation process without voicing. The above 'yayomucha', for example, is dealt with in the following manner in which the third character is 'mu' when the variable N is '3' and since the next character is 'chi', 'mu' can be pronounced separately.

When the Nth character may be followed by another character as far as the above process is concerned, Step SP107 is followed. At Step SP107, a decision is made on whether the Nth character together with another N+1 character can be pronounced with one sound. This decision can be made by referring to the table of character strings of FIG. 5B illustrative of each combination of two characters to be pronounced with one sound. In other words, a character string can be decided as what is pronounceable with one sound as long as the character string is found in the table, whereas it is a character string which is unpronounceable with one sound when it is absent from the table.

When the combination of two characters is unprounceable with one sound, the above Step SP104 is followed and it is separately pronounced at Step SP105 or otherwise not pronounced at all and the next character is subjected to processing.

In reference to the above 'yayomucha', for example, the fourth character is 'chi' when the variable N becomes '4'. As shown in FIG. 5B, 'chi' may be followed by 'cha', 'chu' and 'cho' and when 'yo' is followed further, Step SP108 is followed since the latter combination is pronounceable with one sound.

At Step SP108, the voice data concerning the character string with the Nth character and the N+1 character is output and voiced from the speaker. Since the Nth character is 'chi' and the N+1 character is 'yo', 'cho' is pronounced in the above example. Since the two characters are voiced in this case, further, the variable N is incremented by only '2' at the following Step SP109 and at Step SP110, a decision is made on whether the process concerned is terminated or if the process concerned is not to be terminated, the above Step SP102 is followed again, so that the next unprocessed character is repeatedly subjected to the above process. In reference to the above 'yayomucha', the process concerned is terminated. Consequently, the noun portion is voiced like 'yamucha' as described above.

When an object to be processed is the last character as far as the above process is concerned, Step SP111 is followed from Step SP102. At Step SP111, a decision is made on whether the Nth character (the last character) is separately pronounceable and if it is separately pronounceable, the character is voiced at Step SP112. If the character is not separately pronounceable, on the other hand, the process concerned is terminated without having it voiced.

As set forth above, according to aspect 1 of the invention, when the translation instruction means instructs the translation of the phrase containing the character or the word in the first language added by the input means, the voice information read means operates to read the voice information in the second language corresponding to the phrase from the first voice information storage means and the voice information concerning the character or the word in the first language thus added by the second voice information storage means. Therefore, even though the character or the word added to the phrase is a character string peculiar to the pronunciation of the first language as a result of the translation of the phrase in the first language into the second language, the advantage is that it can be pronounced roughly with the intonation of the first language as at least the source translation language.

According to aspect 5 of the invention, when the translation instruction means instructs the translation of the phrase with the character or the word added thereto into the second language, the voice information read means reads the voice information from the voice storage means with respect to the phrase, and reads the voice information from the character voice storage means with respect to the portion corresponding to the character or the word thus added, thus causing the voice output means to output the voice information thus read by the voice information read means, the advantage being that as a result of the translation of the phrase in the first language into the second language, the character or the word thus added can be voiced by the speaker whose native language is the first language as at least the source translation language even though the character or the word added to the phrase is a character string peculiar to the pronunciation of the first language.

According to aspect 6 of the invention, the display means normally displays the phrase with the character or word attachable portion by attaching the special symbol thereto and when the character or the word is input by the input means, replaces the first special symbol with the character or the word concerned, whereas when the phrase in the first language is translated by the translation means into the second language, the display means is not allowed to display the character or the word input by the input means at the time the translated phrase is displayed. Therefore, even when the character or the word thus input is displayed with a character peculiar to the source translation language, the advantage is that an unclear character string in meaning as a result of translation can be prevented from being displayed.

According to aspect 10 of the invention, the display means displays the phrase containing the addable portion out of phrases and irrespective of the fact that the character or the word that has been input by the input means is pronounceable, the character or the word concerned is attached to the phrase before being displayed. Moreover, the voice output means is restrained from outputting with voice any one of the characters or words that are unpronounceable, so that it is made possible to input any character or word which is unpronounceable without input restrictions at satisfactory speed and to voice such a character or a word in a recognizable mode at least.

What is claimed is:

1. A language information processing apparatus comprising:
    a display that displays a phrase to which a character or a word can be added;
    a user interface that receives as input a character or a word to be added to the phrase displayed on the display; and
    a controller that causes the phrase to be output by voice in a first language with an intonation in the first language and the character or word added to be output in a second language with an intonation in the second language as a single phrase.

2. The language information processing apparatus of claim 1, further comprising:
    a first voice information memory that stores first voice information corresponding to the phrase in the first language; and
    a second voice information memory that stores second voice information corresponding to the character or word to be added to the phrase, the second voice information being voice information in the second language, wherein the controller translates the phrase containing the added character or the word based on the first voice information and second voice information.

3. The language information processing apparatus of claim 2, wherein the phrase is input through the user interface in the second language.

4. The language information processing apparatus of claim 1, wherein the display displays the phrase along with an identifier of an area in the phrase where a character or a word can be added.

5. A language information processing method comprising:
    receiving a phrase in a first language;
    translating the phrase into a second language;
    receiving a character or word to be added to the phrase in the first language; and
    outputting the phrase with the added character or word as a single output phrase wherein the phrase is output in the second language with an intonation in the second language and the character or word is output in the first language with an intonation in the first language.

6. The language information processing method of claim 5, wherein the step of translating further comprises reading first voice information from a first voice information memory corresponding to the phrase in the second language, and wherein the step of outputting the phrase further comprises outputting the first voice information read from the first voice information memory and outputting second voice information from a second voice information memory corresponding to the added character or word.

7. The language information processing method of claim 5, wherein the step of outputting the phrase includes at least one of displaying the single output phrase on a display and outputting the single output phrase as audio information.

8. The language information processing apparatus of claim 7, wherein the display displays the phrase along with an identifier of an area in the phrase where the character or a word can be added.

9. A language information processing apparatus for translating a phrase in a first language into a corresponding second language and outputting the translated phrase, the apparatus comprising:
    display means for displaying the phrase,
    input means for inputting a character or a word in the first language to be added to the phrase displayed by said display means,
    first voice information storage means for storing voice information corresponding to the phrase in the second language,
    second voice information storage means for storing voice information concerning the character or the word in the first language with an intonation in the first language, which character or word is input by said input means,
    translation instruction means for instructing the translation of the phrase containing the character or the word in the first language, which character or word has been added by said input means,
    voice information read means for reading the voice information in the second language corresponding to the phrase, from said first voice information storage means based on instructions from said translation instruction means, and reading the added character or word in the first language from said second voice information storage means,
    voice output means for outputting as a single voice output phrase, the voice information corresponding to the phrase in the second language with the added character or word in the first language.

10. The language information processing apparatus of claim 9, wherein voice information concerning the character or the word in the first language as stored by said second voice information storage means is prepared with an intonation voiced by a speaker whose native language is the first language.

11. The language information processing apparatus of claim 9, wherein said display means displays the phrase by clarifying an area in which a character or a word can be added, and the phrase is displayed by adding to the area the character or the word that has been input by said input means.

12. The language information processing apparatus of claim 11, further comprising:

phrase storage means for storing a phrase in the second language corresponding to the phrase in the first language, and phrase read means for reading the phrase in the second language corresponding to the phrase in the first language from said phrase storage means under instructions from said translation instruction means, wherein said display means displays other than the appended character or the appended word out of the phrase in the second language corresponding to the phrase in the first language read by said phrase read means.

13. A language information processing apparatus for translating a phrase in a first language into a corresponding second language and outputting the translated phrase, the apparatus comprising:

input means for inputting a character or a word to be added to the phrase in the first language, voice storage means for storing voice information in the second language with an intonation in the second language according to the voice voiced by a speaker whose native language is the second language, character voice storage means for storing voice information corresponding to the character or the word in the first language with an intonation in the first language according to the voice voiced by a speaker whose native language is the first language, translation instruction means for instructing the translation of the phrase with the appended character or the appended word into the second language, voice information read means for reading voice information from said voice storage means with respect to the phrase under instructions from said translation instruction means and reading voice information from said character voice storage means with respect to a portion corresponding to the appended character or the appended word, voice output means for outputting as voice output, the voice information read from said voice storage means and said character voice storage means as a single phrase.

14. A language information processing apparatus for translating a phrase in a first language into a corresponding second language and outputting the translated phrase, the apparatus comprising:

display means for adding a special symbol to the attachable portion of a phrase to which a character or a word is attachable out of phrases in the first language and displaying the phrase, input means for inputting the character or the word to be added to the phrase displayed by the display means, and translation means for translating a phrase in the first language into the second language, wherein when the character or the word is input by the input means, the display means replaces the special symbol with the character or the word concerned so as to display the replacement, and when the phrase in the first language is translated into the second language, the display means displays the phrase thus translated, though the translation means translates the character or the word that has been input by the input means, the display means does not display the character or word thus translated.

15. The language information processing apparatus of claim 14, wherein said display means replaces with a second symbol the character or the word that has been input by said input means and translated but not displayed.

16. The language information processing apparatus of claim 14, wherein said display means adds the first symbol to an attachable portion of the phrase that has not been input by said input means but translated by said translation means into the second language.

17. The language information processing apparatus of claim 14, further comprising:

storage means for storing the phrase in the second language by corresponding the phrase in the second language to the phrase in the first language, and translation instruction means for instructing the translation of the phrase in the first language, wherein said translation means reads the phrase in the second language corresponding to the phrase in the first language from said storage means under instructions from said translation instruction means.

* * * * *